Figure 1:
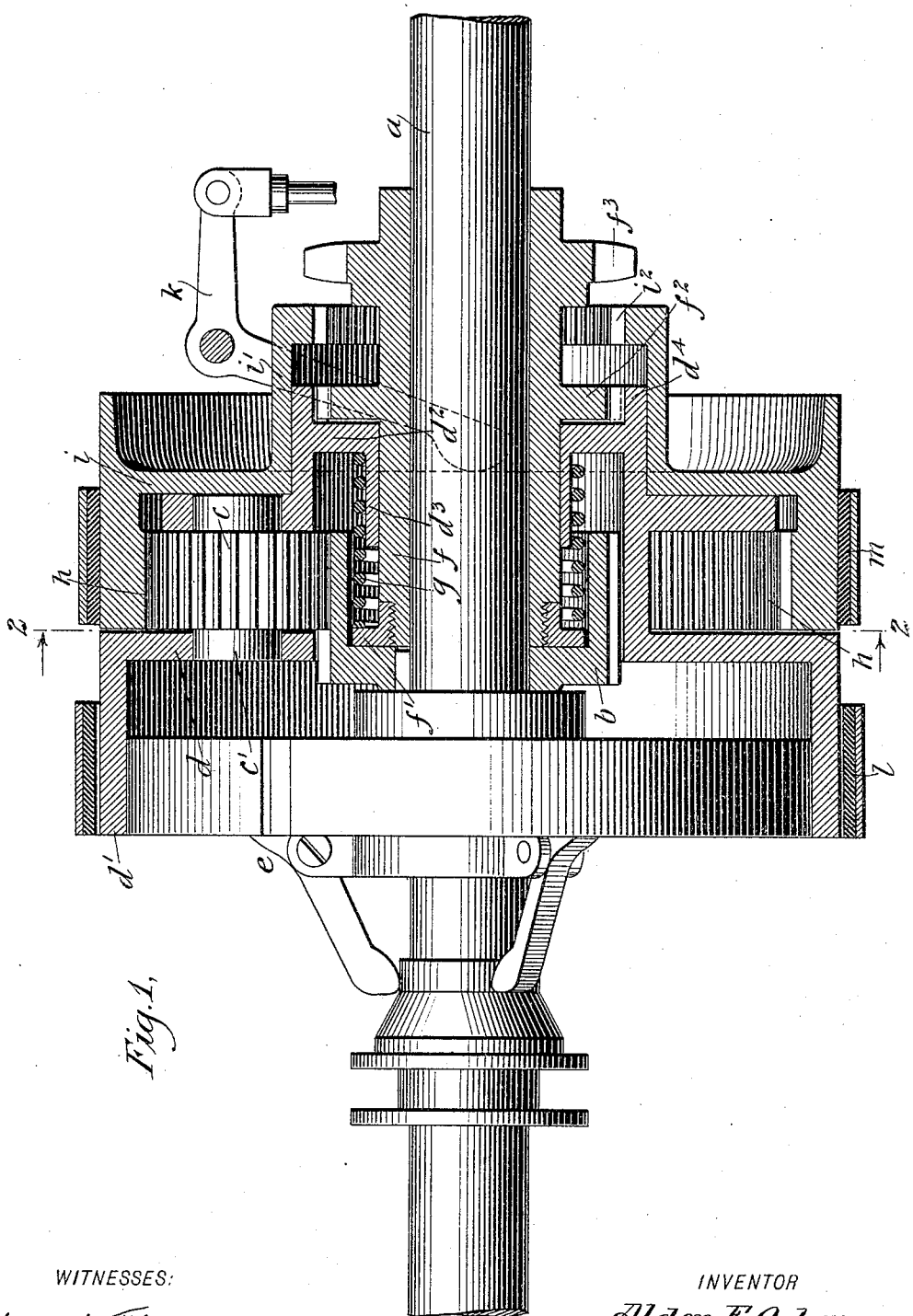

No. 773,414. PATENTED OCT. 25, 1904.
A. E. OSBORN.
TRANSMISSION GEAR.
APPLICATION FILED NOV. 16, 1903.
NO MODEL. 3 SHEETS—SHEET 1.

WITNESSES:
Edward Thorpe.
Isaac B. Owens.

INVENTOR
Alden E. Osborn
BY
Munn
ATTORNEYS.

No. 773,414. PATENTED OCT. 25, 1904.
A. E. OSBORN.
TRANSMISSION GEAR.
APPLICATION FILED NOV. 16, 1903.
NO MODEL. 3 SHEETS—SHEET 2.

WITNESSES:
Edw. Thorpe.
Isaac B. Owens.

INVENTOR
Alden E. Osborn
BY Munn
ATTORNEYS.

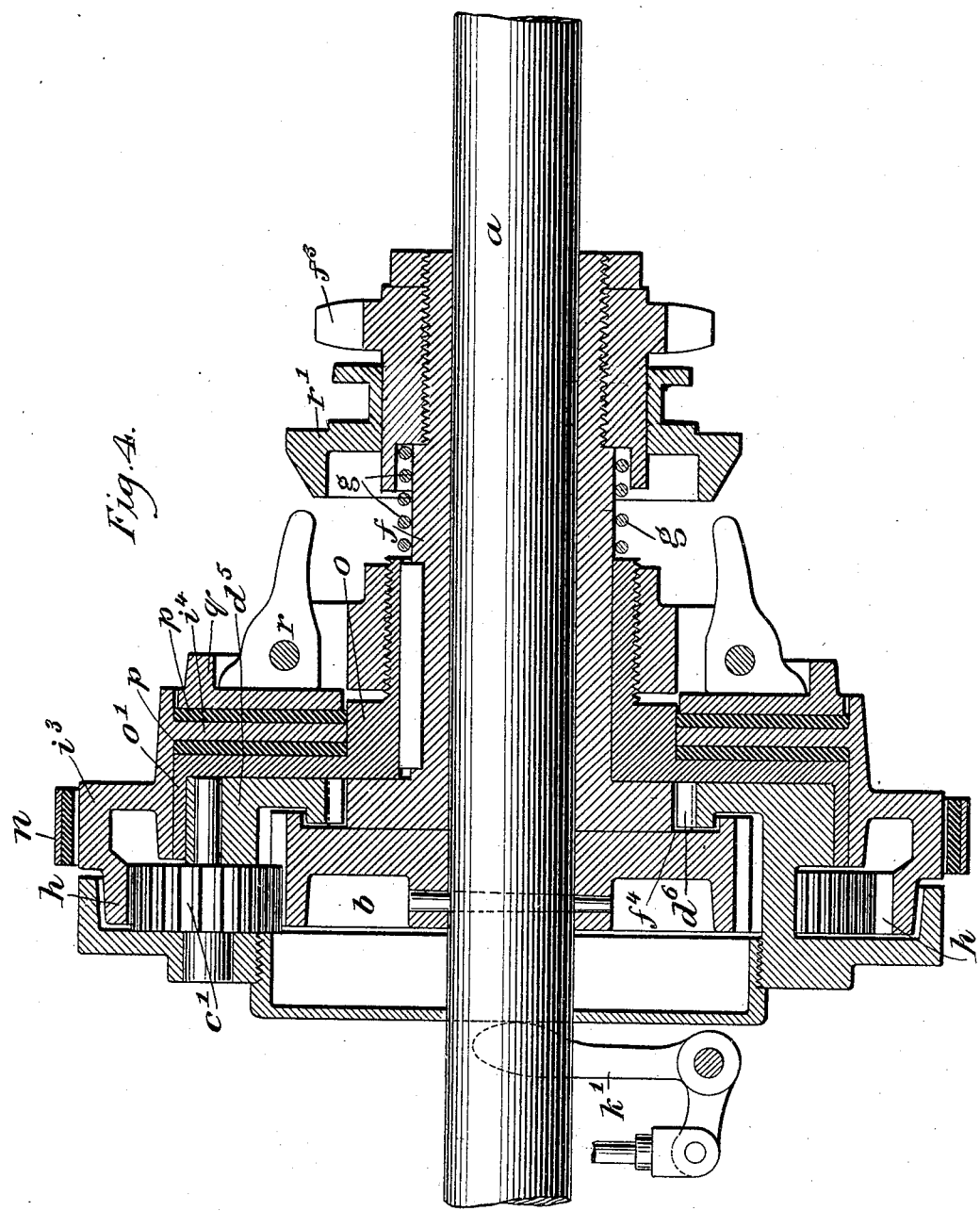

No. 773,414. Patented October 25, 1904.

UNITED STATES PATENT OFFICE.

ALDEN E. OSBORN, OF NEW YORK, N. Y.

TRANSMISSION-GEAR.

SPECIFICATION forming part of Letters Patent No. 773,414, dated October 25, 1904.

Application filed November 16, 1903. Serial No. 181,323. (No model.)

*To all whom it may concern:*

Be it known that I, ALDEN E. OSBORN, a citizen of the United States, and a resident of the city of New York, borough of the Bronx, in the county and State of New York, have invented a new and Improved Transmission-Gear, of which the following is a full, clear, and exact description.

This invention relates to a means for transmitting motion at different speeds and in different directions.

It comprises a system of gearing of the sun-and-planet type especially adaptable to motor-vehicles, but useful in other connections—as, for example, on machine-tools.

Primarily the object of the invention is to provide a gear of this character having the least number of parts consistent with sufficient strength and efficiency. To this end I employ in connection with the driving and driven elements a pinion, a planetary gear coacting therewith, and an internal gear inclosing and meshing with the planetary gear, the planetary gear having a suitable mount and the internal gear being also suitably mounted, the axes of said mountings being coincident and said pinion being in connection either with the driving or driven elements and said mountings being shiftable axially, respectively, to effect connection with or disconnection from the element other than that with which the pinion is connected. Working with these parts is a clutch for directly connecting the driving and driven elements.

In the specific embodiment of my invention here illustrated two speeds forward and one reverse are provided and the pinion is fast to the driving element, while the driven element is in the form of a sleeve axially coincident with the driving element and having clutch-teeth with which one or both of the gear-mountings are engageable, both mountings sliding on the driven sleeve and the clutch acting directly between the drive shaft or sleeve and one of the gear-mounts. This specific arrangement is not, however, essential to the principle of my invention.

This specification is a specific description of the above-referred-to specific embodiment of my invention, while the claims are definitions of the actual scope thereof.

Reference is to be had to the accompanying drawings, forming a part of this specification, in which similar characters of reference indicate corresponding parts in all the figures.

Figure 2:
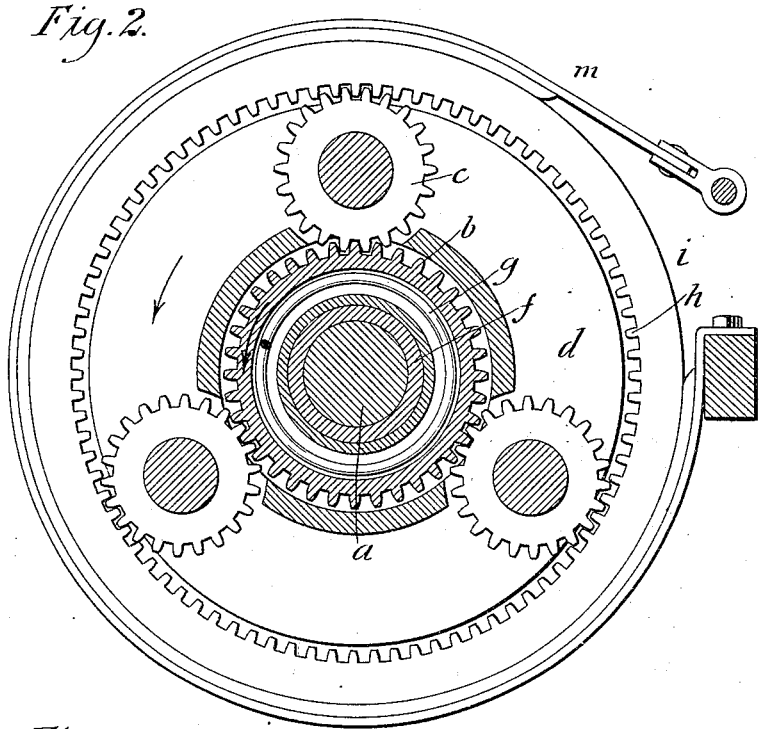
Figure 3:
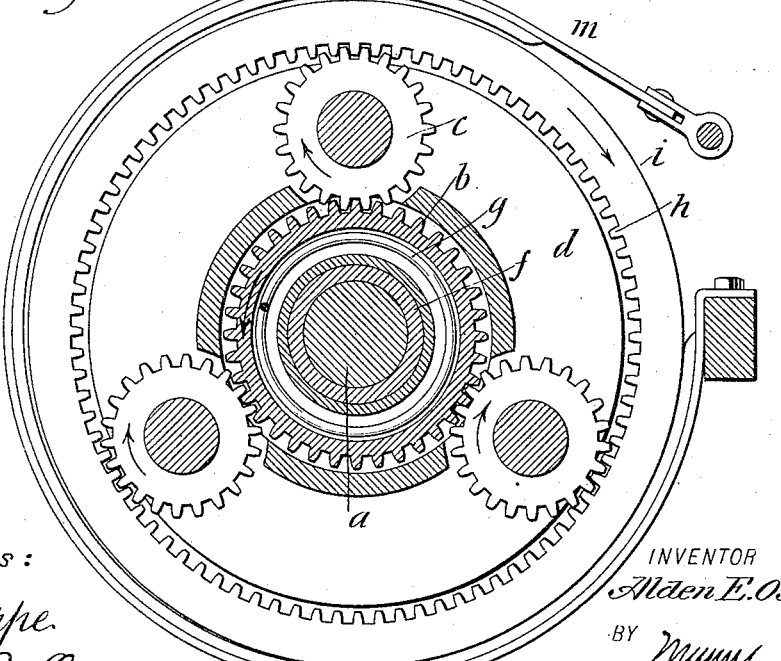

Figure 1 is a longitudinal section of the gear. Figs. 2 and 3 are cross-sections on the line 2 2 of Fig. 1 and illustrating particularly the coactive gear movements, and Fig. 4 is a longitudinal section of a modified form of gear.

In Figs. 1, 2, and 3, $a$ indicates the drive-shaft, which passes axially through the gearing and constitutes the sustaining member thereof, and $b$ indicates the driving-pinion, keyed on the shaft. With this pinion are meshed a number of planetary gears $c$, the shafts $c'$ of which are carried on the planetary-gear mount $d$. $e$ indicates a clutch of any suitable form which acts between a concentric flange $d'$ on the gear-mount $d$ and the shaft $a$ to fasten the parts $d$ and $a$ directly together. The hub $d^2$ of the gear-mount $d$ has a reëntrant tubular extension $d^3$, which is fitted loosely on the driven sleeve $f$, this sleeve being in turn loosely mounted on the shaft $a$ and having at its inner end a flange $f'$, between which and the hub $d^2$ of the gear-mount $d$ an expansive spiral spring $g$ is arranged. $h$ indicates the internal gear inclosing and meshing with the planetary gears, and $i$ indicates the mount therefor, which mount is preferably an integral part of the gear $h$, having its hub $i'$ mounted loosely on the hub $d^2$ of the gear-mount $d$. $k$ indicates any suitable means bearing against the gear-mount $i$ for pressing said mount and the mount $d$ as a unit leftward in Fig. 1, contrary to the action of the spring $g$, said spring returning these parts as a unit to the position shown in Fig. 1 when the pressure on the device $k$ is relaxed. The driven sleeve $f$ is provided with clutch-teeth $f^2$, and the hubs $d^2$ and $i'$ of the gear-mounts are respectively formed with clutch-teeth $d^4$ and $i^2$. The spring $g$ forces the gear-mounts rightward, Fig. 1, to engage the teeth $d^4$ with the teeth $f^2$, and by the operation of the device $k$ the gear-mounts may be pushed leftward to disengage the teeth $d^4$ from the teeth $f^2$ and to engage the teeth $i^2$ with said teeth $f^2$. $f^3$ indicates a sprocket or other means for transmitting the movement of the driven element $f$. In connection with the shifting of the gear-mounts it will be observed that this does not interfere with the mesh of the gears $b$, $c$, and $h$, since the face of the gear $b$ is broadened to allow the specified movement, and the mounts of the gears $c$ and $h$ always shift as a unit. $l$ indicates a restraining device applied to the flange $d'$ of the gear-mount $d$, and $m$ indicates a restraining device applied to the periphery of the gear-mount $i$.

In the operation of the device to attain high speed the clutch $e$ should be rendered active, thus turning the gear-mount $d$ with the shaft $a$ and moving the gear $c$ bodily with the gear $b$ around the axis of the shaft. This causes a like turning movement of the mount $i$, and therefore the sleeve $f$ is driven direct from the shaft $a$, notwithstanding which of the teeth $d^4$ or $i^2$ are in direct connection with the driven sleeve. To attain low speed, the clutch $e$ should be released and the gear-mounts allowed to assume the position shown in Fig. 1. Then by arresting the movement of the mount $i$ the gears will operate as indicated by the arrows in Fig. 2, and the mount $d$ and sleeve $f$ will be turned in the same direction as the shaft $a$ is turning, but at a lower speed. To reverse this movement, the mounts $d$ and $i$ should be shifted to cause the teeth $i^2$ to connect with the teeth $f^2$, and then the movement of the mount $d$ should be arrested. This will cause the gears to operate as indicated by the arrows in Fig. 3, and the mount $i$ and consequently the sleeve $f$ will then be driven reversely to the movement of the driving-shaft. In addition to its functions of transmitting movement this organism provides two distinct and wholly effective brakes for restraining the movement of the driven sleeve $f$ and of the part or parts which may be in driving connection therewith. The apparatus may be used as a brake by operating either one of the restraining devices $l$ or $m$, according as to which of the gear-mounts is in connection with the sleeve $f$ through the medium of their teeth $d^4$ or $d^2$.

The modification shown in Fig. 4 involves merely a reorganization of the elements above described. The planetary-gear mount $d^5$ has at its inner periphery teeth $d^6$, which interlock with teeth $f^4$ on the driven sleeve $f$. Said mount $d^5$ is supported to turn freely within the peripheral flange $o'$ of a collar $o$, which is splined on the sleeve $f$. The internal-gear mount $i^3$ is carried to turn around said flange $o'$ and has an internal web $i^4$ fitting between two friction-rings $p$. $q$ indicates a ring lying against the outer friction-ring $p$, while the inner friction-ring bears against the collar $o$. By means of elbow-levers $r$ and a cam-collar $r'$ said parts $o$, $p$, $i^4$, and $q$ may be clamped firmly together, and in this manner the gear-mount $i^3$ will be rendered fast on the sleeve $f$. The pinion $b$ is double-faced, as before, and the two gear-mounts, with their gears, are arranged to be slid rightward from the position shown in Fig. 4 by a device $k'$, thus disengaging the teeth $f^4$ and $d^6$, the parts $o$, $p$, $q$, and $r$ following the sliding movement. A spring $g'$, corresponding in function to the previously-described spring $g$, may be employed to return the gears and their mounts to the leftward position. This spring may be arranged in any desired manner—for example, as shown in Fig. 4. A single restraining device $n$ is provided and either of the two gear-mounts is arranged to move within this restraining device, so that one restraining device acts for both mounts. In the operation of this modified form of the gear to attain high speed when the parts are positioned as in the drawings the cam-collar $r'$ should be moved leftward, thus locking the internal-gear mount on the sleeve $f$, and since the planetary-gear mount is already locked to this sleeve by the teeth $f^4$ and $d^6$ it is clear that the whole gear must turn as a unit. To attain low speed, the collar $r'$ should be moved back and the restraining device $n$ applied to the internal-gear mount $i^3$. The planetary gear will then run around the internal gear and carry with it (the planetary gear) the mount $d^5$ and sleeve $f$, but driving said parts at a lower speed than that of the pinion, the movement being the same as shown in Fig. 2. To attain reverse speed, the gear-mounts should be shifted to disengage the teeth $d^6$ and $f^4$ and to place the planetary-gear mount within the grasp of the restraining device. Then by applying the restraining device to the internal-gear mount and tightening the clutch parts $p$, $i^4$, and $q$, fastening the internal-gear mount to the collar $o$ and sleeve $f$, said sleeve will be driven reversely to and at a slower speed than the pinion, the movement corresponding to that shown in Fig. 3.

From the foregoing it will be seen that while this organism of gears provides two speeds forward and one reverse it involves only one set of planetary gears, and consequently it avoids the weight, expense, and complication of the extra set of planet-gears heretofore regarded as necessary in gearing of the same capacity. Also when fitted to a motor-driven vehicle it dispenses with the necessity of other brakes for the vehicle, since by means of my invention, as shown in Figs. 1, 2, and 3, two distinct positively-acting brakes are, and, as shown in Fig. 4, one positively-acting brake is, provided. The spring $g$ and the device $k$, as in Figs. 1, 2, and 3, acting in opposition greatly reduce the friction otherwise involved in connection with devices for shifting the gear-mounts, since when the parts are running in the position shown in Fig. 1 (low speed) and at high speed the device $k$ may be placed out of engagement with the mount $i$ or so lightly engaged as to involve no appreciable retarding influence. It is only when the parts are in reverse position that there is any positive engagement between the device $k$ and the mount $i$, and even then this engagement is only of a force equal to the tension of the spring $g$.

It will be noted that no interlocking devices will be required with this gear in order to prevent throwing it to reverse position when the other speeds are being transmitted, as the application of the brake bands or clutch to the drums will prevent their being shifted sidewise for the reverse. It is not essential that the driving force be applied to the shaft $a$, and although the order of movement would be reversed if the driving force were applied to the sleeve $f$ the parts would still perform essentially the function herein described.

I desire it understood that in the following claims the term "restraining" is employed as meaning to check or hold in the rotating means, as well as to actually stop their movement.

Various changes in the detailed embodiment of the invention may be resorted to without departing from the spirit of the invention as defined in the claims.

Having thus described my invention, I claim as new and desire to secure by Letters Patent—

1. In a transmission-gear, the combination with a sustaining means, of a pinion, a planetary gear, a rotatable mounting for the planetary gear, a third gear meshed with the planetary gear, a mounting for the third gear, both of said mountings being axially shiftable, a member with which either of said mountings may be connected by the shifting thereof, and means for independently restraining the rotative movements of the gear-mounts.

2. In a transmission-gear, the combination with the sustaining means, of a pinion, a planetary gear meshed therewith, a rotatable mounting for the planetary gear, a third gear meshed with the planetary gear, a rotatable mount for the third gear, means for independently restraining the rotative movements of said mountings, a member coacting with the gear-mounts, the gear-mounts being shiftable relatively to the pinion and means for connecting said member with either gear-mount upon the shifting of the mounts.

3. In a transmission-gear, the combination with a supporting-shaft, of a pinion fast thereto, a planetary gear meshed with the pinion, a rotative mount for the planetary gear, a third gear meshed with the planetary gear, a rotative mount for the third gear, both of said mounts being also axially shiftable, means for independently restraining the rotative movements of the mounts, a sleeve loose on the supporting-shaft, and means for axially shifting the gear-mounts, and for locking either mount with the sleeve upon the shifting of the gear-mounts.

4. In a transmission-gear, the combination with a sustaining means, of a pinion, a planetary gear, a rotatable mounting for the planetary gear, a third gear meshed with the planetary gear, a mounting for the third gear, both of said mountings being axially shiftable, a member adapted to be connected with either gear-mount, means for shifting the gear-mounts and for connecting either mount with said member upon the shifting of the mounts, means for independently restraining the rotative movements of the gear-mounts, and means in addition to the aforesaid elements and coacting with certain thereof for causing the transmission-gear to turn as a unit.

5. In a transmission-gear, the combination with a supporting-shaft, of a pinion fast thereto, a planetary gear meshed with the pinion, a rotative mount for the planetary gear, a third gear meshed with the planetary gear, a rotative mount for the third gear, both of said mounts being also axially shiftable, means for independently restraining the rotative movements of the mounts, a sleeve loose on the supporting-shaft, means for axially shifting the gear-mounts and for connecting either gear-mount with the sleeve, upon the shifting of the gear-mounts, and means in addition to the aforesaid elements and coacting with certain thereof for causing the transmission-gear to turn as a unit.

6. In a transmission-gear, the combination with the driving and driven elements, of two coacting gears, a rotatable mount for each of said gears, the gear-mounts being also axially shiftable, means for independently restraining the rotation of said mounts, a gear in connection with one of the aforesaid elements and meshed with one of the said coacting gears, and means for connecting either of the gear-mounts with the other of the aforesaid elements, said means being operative upon the axial shifting of the gear-mounts.

7. In a transmission-gear, the combination with the driving and driven elements, of two coacting gears, a rotatable mount for each of said gears, the gear-mounts being also axially shiftable, means for independently restraining the rotation of said mounts, a gear in connection with one of the aforesaid elements and meshed with one of the said coacting gears, means for connecting either of the gear-mounts with the other of the aforesaid elements, said means being operative upon the axial shifting of the gear-mounts, and means for so shifting the gear-mounts.

8. In a transmission-gear, the combination with the driving and driven elements, of two coacting gears, a rotatable mount for each of said gears, the gear-mounts being also axially shiftable, means for independently restraining the rotation of said mounts, a gear in connection with one of the aforesaid elements and meshed with one of the said coacting gears, means for connecting either of the gear-mounts with the other of the aforesaid elements, said means being operative upon the axial shifting of the gear-mounts, a spring pressing the gear-mounts in one direction, and means for acting against the spring to press the gear-mounts in the other direction.

9. In a transmission-gear, the combination with the driving and driven elements, of two coacting gears, a rotatable mount for each of said gears, the gear-mounts being also axially shiftable, means for independently restraining the rotation of said mounts, a gear in connection with one of the aforesaid elements and meshed with one of the said coacting gears, means for connecting either of the gear-mounts with the other of the aforesaid elements, said means being operative upon the axial shifting of the gear-mounts, and a releasable means in addition to the other parts and coacting with certain thereof for causing the transmission-gear to turn as a unit.

10. In a transmission-gear, the combination with the driving and driven elements, of two coacting gears, a rotatable mount for each of said gears, means for independently restraining the rotation of said mounts, a gear in connection with one of the aforesaid elements and meshed with one of the said coacting gears, means for connecting either of the gear-mounts with the other of the aforesaid elements, said means being operative upon the axial shifting of the gear-mounts, and a releasable means in addition to the other parts and coacting with certain thereof for causing the transmission-gear to turn as a unit.

11. In a transmission-gear, the combination of a driving element, a pinion fast thereto, a planetary gear, a rotatable mounting for the planetary gear, a third gear meshed with the planetary gear, a mounting for the third gear, both of said mountings being axially shiftable, a member to which either of said mountings may be fastened by the shifting thereof, and a band for restraining the rotative movement of the gear-mount not fastened to the said member.

12. In a transmission-gear of the planetary type, the combination of axially-shiftable drums, an encircling band, a means for shifting any one of said drums within said encircling band, and a means for contracting the said band upon the drum which is within it, to restrain the rotative movement of that drum.

13. In an organized transmission-gear, the combination of two restrainable shiftable members, and a single restraining means, to which either of said members may be shifted.

14. In a transmission-gear, the combination with a sustaining means, of a pinion, a planetary gear, a rotatable shiftable mounting for the planetary gear, a third gear meshed with the planetary gear, a mounting for the third gear, a member coacting with both of said mountings, disconnectible means for connecting the said member and the planetary-gear mount upon shifting the latter, a clutch for connecting the said member and the mounting for the third gear, and means for independently restraining the movement of the gear-mounts.

15. In a transmission-gear, the combination with a sustaining means, of a pinion, a planetary gear, a rotatable mounting for the planetary gear, a third gear meshed with the planetary gear, a mounting for the third gear, a member coacting with both of said mountings, disconnectible means for connecting the said member and the planetary-gear mount, a clutch for connecting the said member and the mounting for the third gear, and means for independently restraining the movement of this gear-mount, the said means for connecting the planetary-gear mount and the said member comprising interengaging teeth on said parts, one of the same being shiftable to engage and disengage the teeth.

16. In a transmission-gear, the combination with a sustaining means, of a pinion, a planetary gear, a rotatable mounting for the planetary gear, a third gear meshed with the planetary gear, a mounting for the third gear, a member coacting with both of said mountings, disconnectible means for connecting the said member and the planetary-gear mount, a clutch for connecting said member and the mounting for the third gear, and means for independently restraining the movement of the gear-mount, the said clutch comprising a collar attached to the said coacting member, a web on the mount of the third gear, a clamping-ring, friction-rings interposed between the collar, web and clamping-ring, and means for operating the clamping-ring.

17. In a transmission-gear, the combination of driving and driven elements, two shiftable transmitting members, controllable means for causing said members to be revolubly driven from the driving element, and means for shifting said members and for connecting them alternately with the driven element upon the shifting of said members.

18. In a transmission-gear, the combination of driving and driven elements, two shiftable transmitting members, controllable means for causing said members to be revolubly driven from the driving element, means for shifting said members and for connecting them alternately with the driven element upon the shifting of said members, and means in addition to the aforesaid elements and coacting with certain thereof for causing the transmission-gear to turn as a unit.

19. The combination with a driving element, a driven element, transmission devices operating between the two and including a rotatable axially-shiftable gear-mount, means for connecting said gear-mount with one of said elements upon the shifting of the mount, and means for connecting the other of said elements to the transmission devices.

In testimony whereof I have signed my name to this specification in the presence of two subscribing witnesses.

ALDEN E. OSBORN.

Witnesses:
JOHN H. GRATACAP,
W. W. OSBORN.